United States Patent [19]

Torgersen et al.

[11] 4,303,701

[45] Dec. 1, 1981

[54] METHOD OF MARKING PLASTIC LENSES

[75] Inventors: Daniel L. Torgersen, Sauk Rapids; Leon H. Fischer, Cold Spring, both of Minn.

[73] Assignee: Buckbee-Mears Company, St. Paul, Minn.

[21] Appl. No.: 108,341

[22] Filed: Dec. 31, 1979

[51] Int. Cl.³ .................... G02B 1/10; C09K 11/00
[52] U.S. Cl. ........................ 427/145; 8/507; 8/509; 8/512; 427/7; 427/157; 427/164
[58] Field of Search ............ 427/7, 145, 157, 164; 8/507, 509, 512

[56] References Cited

U.S. PATENT DOCUMENTS

| | | | |
|---|---|---|---|
| 1,475,473 | 11/1923 | Drescher | 430/494 X |
| 1,607,395 | 11/1926 | Gallasch | 427/165 X |
| 1,644,798 | 10/1927 | Tillyer et al. | 65/30 R X |
| 2,542,386 | 2/1951 | Beattie | 264/1 |
| 2,848,348 | 8/1958 | McCafferty | 427/157 |
| 4,039,827 | 8/1977 | Zdrok et al. | 264/1 X |
| 4,146,696 | 3/1979 | Bond et al. | 264/1 X |
| 4,157,892 | 6/1979 | Tanaka et al. | 430/146 X |
| 4,238,524 | 12/1980 | La Liberte et al. | 427/7 |

FOREIGN PATENT DOCUMENTS 1439173  6/1976  United Kingdom .................. 427/7

*Primary Examiner*—James R. Hoffman
*Attorney, Agent, or Firm*—Jacobson and Johnson

[57] ABSTRACT

A method of marking plastic lenses to selectively identify a lens by impregnating a fluorescent material into the surface of the lens so that when the lens is exposed to ultraviolet light it fluoresces.

6 Claims, No Drawings

METHOD OF MARKING PLASTIC LENSES

BACKGROUND OF THE INVENTION

1. Field of the Invention

This invention relates generally to plastic lenses and, more specifically, to a method of selectively identifying plastic lenses.

2. Description of the Prior Art

The method of marking ophthalmic lenses or lenses which must be visually clear has been accomplished in the art by various means. A typical prior art method is shown in the Drescher U.S. Pat. No. 1,475,473. Drescher marks a glass lens by altering the composition of the lens by subjecting the lens to "the action of rays emanating from the vacuum tube through which a current of electricity is passed embodying an anode or terminal of metallic tungsten and a cathode consisting of a tungsten spiral electrically heated". The action produces a chemical reaction in the glass that produces a faint violet color throughout the lens.

The Tillyer U.S. Pat. No. 1,644,798 shown another method of marking in which a stannous chloride solution is applied to the finished surface by a brush, rubber stamp or stencil. The treatment alters the surface tension of liquids on the lens so that condensation of moisture on a treated part has different size globules than on the untreated surfaces.

Still another method of marking glass lenses is shown in the Gallasch U.S. Pat. No. 1,607,395. Gallasch applied a waxy substance of balsam, bees wax or candelilla which is applied to the surface of the lens. The lens and material are then heated. The resultant mixture produces a chemical conversion on the surface of the glass that results in a visible marking when water condenses thereon.

The Tanaka U.S. Pat. No. 4,157,892 shows a method of coloring a water absorbent plastic by immersing the plastic in a diazonium double salt and then exposing the plastic to ultraviolet light in portions which are not to be colored.

Still another method of marking intraocular lens is shown in the Zdrok U.S. Pat. No. 4,039,827. Zdrok uses the technique of altering the refractive index of the lens by exposing the lens to ultraviolet radiation of sufficient intensity to create a slight differential in the refractive index of the lens in the region of the exposure.

Most of the above-indentified prior art patents use some method of marking glass lenses either on a permanent or temporary basis. The Zdrok patent, which is useable with plastic lenses, changes the inherent characteristics of the lens through the application of heat or radiation. In contrast, the present invention provides impregnation of the lens surface with a fluorescent material which, under normal conditions, is invisible; however, when ultraviolet light is shined on it the lens fluoresces.

BRIEF SUMMARY OF THE INVENTION

Briefly, the present invention comprises a method of marking a plastic lens which comprises applying a solution of fluorescent material to the surface of the lens, then heating the fluorescent solution for a sufficient time and at sufficient temperatures to impregnate the fluorescent material into the lens followed by removal of the excess fluorescent material on the surface of the lens.

DESCRIPTION OF THE PREFERRED METHOD

The typical plastic lens used usually comprises either a homopolymer of diethylene glycol bis(allyl carbonate) or methyl metacrylate or copolymers of these monomers. In most cases the primary material contained in lenses is diethylene glycol bis(allyl carbonate) which is known in its polymerized form as CR-39. Typical of the polymer plastic lenses are those shown in the Beattie U.S. Pat. No. 2,542,386 and Bond et al U.S. Pat. No. 4,146,696.

In the manufacture of plastic ophthalmic lenses the inherent problems of mass production of plastic lenses usually result in lenses of varying quality. The lenses that are suitable for opthalmic use are usually divided into two grades, i.e. first quality lenses and second quality lenses, but both are suitable for optical use. In order to distinguish between the first quality lenses and the second quality lenses, it is necessary to have some means of distinctly identifying at least one grade of lenses. Since both quality lenses are made from the same material and at the same time, it is impossible to place a marking on the lens during the manufacturing process.

In the preferred method the polymer plastic lenses of higher quality are impregnated with a fluorescent material which is invisible under normal lighting conditions yet fluoresces when exposed to ultraviolet light. It has been found that those plastic lenses which contain at least some diethylene glycol bis(allyl carbonate) or methyl methacrylate have a polymer structure that permits them to absorb the fluorescent material under certain conditions. That is, the chemical structure of the plastic lens in such that there are sites for migration of fluorescent material into the polymer network without producing a chemical reaction with the polymers in the plastic lenses. Therefore, other polymer plastic lenses which have sites for migration of fluorescent materials, therein, would also be suitable with the present process.

After manufacture of the plastic lenses, e.g. those which are copolymers of diethylene glycol bis(allyl carbonate) and methyl methacrylate, or homopolymers of diethylene glycol bis(allyl carbonate), those to be marked are selected according to the ophthalmic grade. The steps of the marking process are as follows:

(1) The lens surface is cleaned.

This step is carried out using known methods of cleaning polymeric lenses of this polymeric class such as washing with soap and water, rinsing with solvents such as acetone, methyl ethyl ketone; lower alkanols e.g. methanol, ethnol, isopropanol, and the like.

(2) A formulation of fluorescent material is prepared.

A chemical compound which can be absorbed into the above plastic lenses is selected from known classes of fluorescent whitening agents such as coumarins, diamines formed by reaction of p-diaminostilbenedisulfonic acid and cyanuric chloride, p-distyrylbiphenyls, naphthotriazolylstilbenes and 1,3-disubstituted pyrazolines and is formulated into a suitable vehicle.

Presently preferred fluorescent materials are alkylaminocoumarins, and most preferred are di-lower alkylaminocoumarins such as 7-dimethylamino-4-methylcoumarin, 7-diethylamino-4-methylcoumarin and the like. Other suitable materials include substituted diamines of p-aminostilbene such as 4,4'-bis[4-anilino-6-morpholino-s-triazin-2-yl)amino]2,2'-stilbenedisulfonic acid, 4,4'-bis{{4-anilino-6-[bis(2-hydroxyethyl)amino]-s-triazin-2-yl}amino}-2,2'-stilbenedisulfonic acid, 4,4'-bis[(4,6-dianilino-s-triazin-2-yl)amino]-2,2'-stilbenedisulfonic acid, 4,4′-bis[[4-anilino-6-[(2-hydroxypropyl)amino]-s-triazin-2-yl]amino]-2,2′-stilbenedisulfonic acid disodium salt and 4,4′-bis[[4-anilino-6[N-2-hydroxyethyl-N-methylamino]-s-triazin-2-yl]amino]-2,2′-stilbenedisulfonic acid disodium salt, substituted p-distyrylbiphenyls such as 2,2-(4,4′-biphenylene divinylene)dibenzenesulfonic acid disodium salt, substituted naphthotriazolylstilbenes such as 4-(2H-naphtho[1,2-d]triazol-2-yl)-2-stilbenesulfonic acid sodium salt, and 1,3-disubstituted pyrazolines such as p-[3-(p-chlorophenyl)-2-pyrazolin-1-yl]benzenesulfonamide.

Any suitable vehicles for fluorescent materials such as solutions or pastes can be used. When solutions are used they are generally solutions of 0.5% to 4% by weight of the fluorescent chemical in a suitable solvent such as water and solvent pairs such as water-ethanol, water-acetone, and the like. Preferably the concentrations are 2% to 3% and the preferred solvent is water.

A variety of solvents could be used. The use of other solvents is limited primarily by the temperatures to which they can be heated. It is preferred to use higher temperatures (about 100° C.) to reduce the residence time of the fluorescent material solution on the lens.

Pastes are prepared by mixing 1% to 2% by weight of the fluorescent material with a solution of polymethyl methacrylate in a suitable solvent such as cellosolve acetate. The ratio of polymethyl methacrylate to solvent is from 0.4 to 1 to 0.5 to 1. The exact proportions of the mixture depend upon the crystal form of the fluorescent material used, the fluidity of the polymethyl methacrylate solution and the desired consistency of the paste.

(3) The formulation of fluorescent material is applied to the surface of the lense for sufficient time to permit migration into the lens.

The lens may be at ambient temperature when the fluorescent material is applied, or it may be preheated. Preheating has been found to facilitate penetration of the lens by the fluorescent material. Heating may be carried out by any convenient method such as heat lamp, heating in an inert solvent, drying oven, and the like.

Similarly the formulation of fluorescent material may be at various temperatures and is preferably heated. In particular solutions of fluorescent material are preferably heated to from 70° C. to 100° C., up to the boiling point (e.g. the reflux temperature of the solution).

Pastes of fluorescent material may also be used to apply the material by the thick film screen printing method. The procedure requires the following steps:
(1) Clean the lens as described above in step 1.
(2) Mix the paste as described above in step 2.
(3) Employ a screen of the proper mesh size (as determined by common sizing procedures well known in the screen printing industry and being dependent on the viscosity of the paste).
(4) Place the paste on top of the screen and push the screen down onto the lens surface. The screen should have enough give to conform to the curved surface
(5) Using a squeege, squeege the paste over the screen stencil.
(6) Allow the paste imprint to reside on the lens about 15 minutes.
(7) Clean the excess paste off the lens with a suitable solvent.

The time required to obtain migration of the fluorescent compound into the lenses varies according to the temperatures of both the lenses and the formulations of fluorescent materials.

Another variable is the intensity of fluorescence required. The fluorescence intensity required is that fluorescence must be readily seen by the human eye and/or detected by machine under ultraviolet light, typically at about 365 nm wavelengths are provided e.g. by a 6 watt Blak-Ray UVL 56 bulb.

(4) Cleaning the surface of the lens.

Excess formulation of fluorescent material should be removed by rinsing with a suitable solvent or solvent mixture with agitation and wiping as needed. Suitable solvents include water, ketones, alcohols, esters and the like.

The use of the above materials in marking of lenses meets certain criteria which are important to the lens manufacturer. First, the fluorescent materials permit retention of the optical clarity of the lens; second, the marking is permanent; third, the process permits identification of selected lenses; fourth, the process is easy to apply to the lens.

To illustrate the process of the invention, reference should be made to the following examples which describe the process in greater detail:

EXAMPLE 1

A polymer plastic lens comprised of methyl methacrylate and diethylene glycol bis(allyl carbonate) was cleaned to remove impurities on the surface of the lens. Next, a 3% aqueous solution of fluorescent material comprising 7-diethylamino-4-methylcoumarin was heated to about 95° C.

The plastic lens which was at room temperature of about 25° C. was immersed in the aqueous solution of 7-diethylamino-4-methylcourmarin for a minimum of 10 seconds. After dipping, the lens was removed and allowed to cool to room temperature. The lens was then rinsed in acetone to remove excess fluorescent material on the surface of the lens. Next, the lens was rinsed in water. When the lens was put under ultraviolet light it fluoresced.

EXAMPLE 2

A polymer plastic lens comprised of diethylene glycol bis(allyl carbonate) was cleaned to remove impurities on the surface of the lens. Next a 3% aqueous solution of fluorescent material comprising 7-diethylamino-4 methylcoumarin was heated to about 95° C.

The plastic lens, which was at room temperature of about 25° C., was immersed in the aqueous solution of 7-diethylamino-4methylcoumarin for a minimum of 10 seconds. After dipping, the lens was removed and allowed to cool to room temperature. The lens was then rinsed in acetone to remove excess fluorescent material on the surface of the lens. Next, the lens was rinsed in water. When the lens was put under ultraviolet light it fluoresced.

EXAMPLE 3

A polymer plastic lens comprised of methylmethacrylate and diethylene glycol bis(allyl carbonate) was cleaned to remove impurities on the surface of the lens.

The plastic lens, which was at room temperature of about 25° C., was imprinted with a viscous paste of fluorescent material comprising a mixture of 7-diethylamino-4-methylcoumarin cellosolve acetate and polymethyl methacrylate. The lens was imprinted by applying the viscous paste of fluorescent material to the lens surface. The viscous paste was maintained on the lens surface for a minimum of 15 minutes. The lens was then rinsed in acetone to remove excess fluorescent material on the surface of the lens. Next, the lens was rinsed in water. When the lens was put under ultraviolet light it fluoresced.

EXAMPLE 4

A polymer plastic lens comprised of diethylene glycol bis(allyl carbonate) was cleaned to remove impurities on the surface of the lens.

The plastic lens, which was at room temperature of about 25° C., was imprinted with a viscous paste of fluorescent material comprising a mixture of 7-diethylamino-4 methylcoumarin, cellosolve acetate and polymethyl methacrylate. The lens was imprinted by applying the viscous paste of fluorescent material to the lens surface. The viscous paste was maintained on the lens surface for a minimum of 15 minutes. The lens was then rinsed in acetone to remove excess fluorescent material on the surface of the lens. Next, the lens was rinsed in water. When the lens was put under ultraviolet light it fluoresced.

EXAMPLE 5

The Examples 2 and 4 were repeated except that the viscous paste was applied by the method of thick film screen printing. When the lenses were put under ultraviolet light, they fluoresced.

EXAMPLE 6

The Examples of 1-4 were repeated except the surface temperature of the lens was raised to 50° C. using infrared heating lamps. Examination of the lenses coated at increased temperatures revealed deeper penetration of the fluorescent material into the lenses than at temperatures of 25° C. When the lenses were put under ultraviolet light, they fluoresced.

EXAMPLE 7

Using the methods of Examples 1, 2, 3, 4 and 6 as designated, the following fluorescent compounds are impregnated into plastic lenses. The table indicates the results of these experiments.

| Method Used | Fluorescent Compound Used | Result |
| --- | --- | --- |
| Example 1 | 4,4'-bis[(4-anilino-6-morpholino-s-triazine-2-yl)-amino]-2,2'-stilbenedisulfonic acid | Fluorescent lens obtained |
| Example 2 | 2,2-(4,4'-biphenylene divinylene)-dibenzenesulfonic acid, disodium salt | Fluorescent lens obtained |
| Example 3 | 4-(2H-naphtho[1,2-d]triazol-2-yl)-2-stilbenesulfonic acid, sodium salt | Fluorescent lens obtained |
| Example 4 | p-[3-(p-chlorophenyl)-2-pyrazolin-l-yl]benzenesulfonamide | Fluorescent lens obtained |
| Example 6 | 7-dimethylamino-4-methylcoumarin | Fluorescent lens obtained |

We claim:

1. The method of marking a polymer plastic lens having a polymer network comprising applying a fluorescent material to the surface of a plastic lens, allowing sufficient time to permit migration of the fluorescent material into the polymer network and then removing the excess fluorescent material on the surface of the lens.

2. The invention of claim 1 wherein the formulation of fluorescent material is heated to about 95° C. before applying to the lens surface.

3. The invention of claim 2 wherein the lens is at room temperature of about 25° C.

4. The invention of claim 3 wherein the temperature of the lens is raised to about 50° C. before applying the fluorescent material to the surface of the lens.

5. The method of marking a polymer lens having a polymer network comprising selecting a fluorescent material selected from the group consisting of: alkylaminocoumarins, substituted diamines formed by reaction of p-diaminostilbenedisulfonic acid and cyanuric chloride, p-distyrylbiphenyls, naphthotriazolylstilbenes and 1,3-disubstituted pyrazolines; applying the fluorescent material, allowing sufficient time for the fluorescent material to penetrate into the polymer network and then removing the excess fluorescent material on the surface of the lens.

6. A method according to claim 5 wherein the fluorescent material is 7-dimethylamino-4-methylcoumarin or 7-diethylamino-4-methylcoumarin.

* * * * *